(12) United States Patent
Angus et al.

(10) Patent No.: US 11,655,008 B2
(45) Date of Patent: May 23, 2023

(54) SELF-RIGHTING TRIMARAN

(71) Applicant: Open Ocean Robotics Inc., Victoria (CA)

(72) Inventors: Colin Sinclair Angus, Victoria (CA); Julie Rachel Angus, Victoria (CA)

(73) Assignee: Open Ocean Robotics Inc., Victoria (CA)

( * ) Notice: Subject to any disclaimer, the term of this patent is extended or adjusted under 35 U.S.C. 154(b) by 0 days.

(21) Appl. No.: 17/048,060

(22) PCT Filed: Apr. 16, 2019

(86) PCT No.: PCT/CA2019/050472
§ 371 (c)(1),
(2) Date: Oct. 15, 2020

(87) PCT Pub. No.: WO2019/200473
PCT Pub. Date: Oct. 24, 2019

(65) Prior Publication Data
US 2021/0094658 A1 Apr. 1, 2021

Related U.S. Application Data

(60) Provisional application No. 62/658,979, filed on Apr. 17, 2018.

(51) Int. Cl.
*B63B 43/04* (2006.01)
*H02S 10/40* (2014.01)
*B63B 79/10* (2020.01)
*B63B 1/12* (2006.01)
*B63B 5/00* (2006.01)

(52) U.S. Cl.
CPC ............... *B63B 43/04* (2013.01); *B63B 1/125* (2013.01); *B63B 5/00* (2013.01); *B63B 79/10* (2020.01); *H02S 10/40* (2014.12); *B63B 2209/18* (2013.01)

(58) Field of Classification Search
CPC ......... B63B 43/00; B63B 43/04; B63B 79/10; B63B 1/00; B63B 1/125; B63B 5/00; B63B 2209/18; B63B 35/00; B63B 35/58; H02S 10/40
USPC .................... 114/61.11, 345; 441/35, 38, 40
See application file for complete search history.

(56) References Cited

U.S. PATENT DOCUMENTS

| 3,094,959 A | 6/1963 | Fox |
| 4,223,621 A | 9/1980 | Berger |
| 4,227,474 A | 10/1980 | Ullrich |
| 4,423,695 A | 1/1984 | Rougerie |

(Continued)

FOREIGN PATENT DOCUMENTS

CN 107878669 4/2018

*Primary Examiner* — Lars A Olson
(74) *Attorney, Agent, or Firm* — Nexus Law Group LLP; Nicholas P. Toth

(57) ABSTRACT

A trimaran which includes a self-righting structure positioned near the stern that substantially raises the center of buoyancy. The trimarans two peripheral hulls are shorter than the main hull and positioned near the one end to create an unstable inverted environment wherein when inverted the vessel rests primarily on the self-righting structure and an end of the main hull, substantially raising the center of gravity and creating an unstable configuration. This causes a pitch or roll about the vessel's longitudinal axis, which continues until the vessel has returned to its more stable upright position resting on three hulls.

20 Claims, 7 Drawing Sheets

(56) References Cited

U.S. PATENT DOCUMENTS

| | | | |
|---|---|---|---|
| 4,441,445 A | | 4/1984 | De Weck |
| 4,457,248 A | * | 7/1984 | Thurston .................... B63B 1/14 |
| | | | 114/61.11 |
| 4,562,785 A | | 1/1986 | Priam-Doizi |
| 4,610,212 A | | 9/1986 | Petrovich |
| 4,836,120 A | | 6/1989 | Murphy |
| 4,878,447 A | * | 11/1989 | Thurston .................... B63B 1/14 |
| | | | 114/61.11 |
| 5,056,453 A | * | 10/1991 | Wright .................... B63C 7/003 |
| | | | 441/40 |
| 5,191,850 A | | 3/1993 | Gougeon |
| 6,089,173 A | | 7/2000 | Lande |
| 8,123,577 B2 | * | 2/2012 | Riggs ........................ B63B 1/12 |
| | | | 440/6 |
| 8,869,724 B2 | * | 10/2014 | von der Goltz .......... B63B 1/10 |
| | | | 114/66 |
| 2008/0276850 A1 | | 11/2008 | Immonen |

\* cited by examiner

SELF-RIGHTING TRIMARAN

CROSS REFERENCE TO RELATED APPLICATION

This application claims the benefit of priority of U.S. Provisional Patent Application No. 62/658,979 filed Apr. 17, 2018, which is hereby incorporated herein by reference in its entirety.

TECHNICAL FIELD

The present disclosure relates to a self-righting trimaran.

BACKGROUND

There is a growing industry in developing unmanned autonomous boats to conduct inshore and offshore tasks that previously were completed using manned vessels. Some of the missions these robotic boats are tasked with include collection of oceanic data using sensors, observation, surveillance, and bathymetry. Since many of these vessels are stationed at sea for long periods, various energy harvesting systems have been developed, allowing the boats to operate indefinitely without fuel limitations. Some of the energy sources used by current autonomous boats include wind, solar, wave energy, and the thermal gradient in the top layer of the ocean.

For solar-powered vessels, one of the challenges is having enough deck space to place an adequately sized solar array. Typical mono-hull vessels have relatively small deck area relative to the overall size and mass of the boat. Multi-hulls, boats that possess two or more hulls, are more suitable due to the potential for much greater deck space, however, multi-hulls have the disadvantage of being challenging to make self-righting.

Trimaran craft are multi-hulled vessels with three hulls that generally include a central main hull and two smaller hulls or floats or amas flanking it. Trimarans have been used for thousands of years and are thought to have been first built by indigenous Polynesians and other Pacific islanders nearly 4,000 years ago. This design of boat remains popular and is used in a large variety of vessels including ferries, warships, racing sailing trimarans, personal watercraft, and more.

A capsized multi-hull is harder to right than a monohull because of its significant stability in the inverted position due to the broad beam provided by the amas and lack of a weighted keel. There are several methods of righting multi-hulls. One strategy entails utilizing a harness to pull the stern towards the bow or vice versa. An alternate method involves rolling the craft upright along its longitudinal axis by attaching a righting ropes to the windward ama, flooding compartments in the leeward ama and pulling on the righting ropes while standing on the leeward ama to create a rocking motion whereby the leeward ama is sufficiently flooded to force the boat to roll and return to its upright position. Most of these methods, however, require manual intervention, and are often not practical in rough-ocean situations.

Other proposed methods for righting a capsized multi-hull vessel involve using a mast for buoyancy. One method relies on masthead buoyancy wherein a float is permanently affixed to the masthead. This masthead float would provide buoyancy, which in conjunction with a plurality of rotating floats, would be able to right the vessel. Such a method is proposed in U.S. Pat. No. 4,223,621.

Another proposed method for righting a capsized multi-hull vessel involves an inflatable float, such as a water activated air buoyancy bag, that is attached to the masthead and in the event of a capsize a $CO_2$ cartridge is activated to inflate the buoyancy bag and shift the center of buoyancy to partially right the multi-hull. A masthead float of any type is not sufficient to fully right a multi-hull. Instead, with a sufficiently buoyant masthead float, the vessel will rotate from fully inverted to the point where the masthead float reaches the surface of the water. For a smaller crewed boat, when the boat is in this position, the crew may be able to move their own weight (such as hanging off the vessel using ropes) to shift the center of gravity so the boat continues to rotate until fully upright. For an autonomous unmanned vessel, a masthead float would not be sufficient to fully right the boat.

An alternative method for righting a multi-hull vessel includes winching a floatation device such as an inflatable lift raft to the tip of the submerged mast to shift the center of buoyancy to rotate the craft approximately 90 degrees and then to float or pump out the water from the non-submerged ama to aid in returning the boat to its fully upright position. Yet another method employs a floatable mast. U.S. Pat. No. 5,191,850 details a righting system for a multi-hulled sailing vessel with a floatable mast has mast support cables, including aft mast support cables, extending from the top portion of the mast to vessel anchor points aft of the mast, and extendable and contractible vessel-anchored tackle systems to connect to them. The righting system includes righting lines which are extendable from each aft mast support cable forwardly to anchors on the hull sides of the vessel substantially forwardly of the connection of the aft stay cable to its vessel anchor points, and a load bearing compression pole which is swivellably connectable to the vessel at the mast and to the one of the aft mast support cables which is out of the water when the vessel is in a side-capsized position in which the tip of the mast is floating in the water.

An alternate method for righting a multi-hull vessel disclosed in U.S. Pat. No. 4,610,212 utilizes a highly engineered recreational catamaran that features a unique pivotable mast with a downward extending section that holds an underwater ballast. The ballast aids in righting a capsized boat by using the downward extending mast and ballast as a lever to force the capsized boat over. A convex deck and convex cabin serve to make the cap sized sailboat easier to right. Additionally, floats on the sail and flotation flaps in the sail shorten the self-righting time. Another method used to right sailing trimarans is disclosed in U.S. Pat. No. 4,562,785 wherein the trimaran has watertight floats or amas that can be filled with water and rapidly discharged in order to automatically rotate the float in such a manner that the positioning of the mast and floats will right the vessel. However, these methods rely on a mast which excludes all non-sailing multi-hulls as well as sailing multi-hulls which sustain significant mast damage or are demasted during the capsize.

Another method for righting a multi-hull vessel involves crafts that have floodable chambers as well as buoyancy chambers capable of being filled with compressed air or other inflatable devices that can be manipulated in such a manner as to re-right a capsized vessel. One example of such a method is disclosed in U.S. Pat. No. 4,227,474 which details a catamaran that includes floodable forecastles and buoyancy chambers, and a watertight cabin in the stern separated by bulk heads from the forecastles. Air inlets are provided for introducing compressed air into the buoyancy chambers to effect re-righting of the catamaran. Similarly, U.S. Pat. No. 4,836,120 uses flooding ports and venting ports that are opened to allow at least one hull to partially flood, eliminating the buoyancy previously provided by the hull. Elimination of this buoyancy causes a displacement in the overall center of buoyancy which begins a pitch, or roll about the craft's longitudinal axis, which continues until the center of gravity is located directly under the center of buoyancy and the craft is substantially re-righted. There are significant problems with these methods that could render them ineffective following a capsize, including damage to the chambers or compressed air source, an inadequately charged compressed air source, and damage to related mechanical devices.

A variation of such methods involves using articulating joints to connect the hulls of a multi-hull. U.S. Pat. No. 4,441,445 details a trimaran with at least one articulation joining at least one of its hulls to the remainder of the craft, so as to permit a rotational movement of said hull around an axis, oriented in the longitudinal direction of the craft, by means for at least partially filling said hull with water, and thereafter draining the same even when said hull is submerged, and by means for creating a moment which will induce a rotation of said hull around said axis. This allows one or several hulls to be filled and rotated into a position akin to that of the keel of a keel boat. Thus, the craft will be righted after a capsize, and maintained in a statically stable position, the ballasted hull pointing downwards and the mast upwards, as long as necessary. Similarly, U.S. Pat. No. 6,089,173 discloses a multi-hull watercraft with a pivot connection between the hulls and the cross-members, so that it is possible to right the capsized vehicle by piecemeal rotation of the hulls through 180° from an inverted to an upright disposition. Following this maneuver, the mast may be either rotated up and out of the water to an erect disposition or, alternatively, the mast can be jacked vertically through the deck. In accordance with a second method, the multiple hulls are interconnected by articulated, extendable and contractible cross-members and righting is achieved by sequentially reducing the beam of the craft, canting its buoyant mast from vertical so that the watercraft will roll so as to be floating on one hull and on the buoyant mast and then while canting the mast in the opposite direction again extending the cross-member to increase the beam such that a rotational moment about the one hull is created sufficient to raise the mast out of the water to an upright disposition. These methods rely on complex movement of the hulls requiring the structural integrity of the hull and connection to be intact, and require human intervention.

Being able to right a multi-hull following a capsize is extremely important, however the methods currently available to right multi-hull boats present numerous limitations and are unsuitable for righting an autonomous multi-hull, especially when such a craft does not have a sail. What is needed is a self-righting system for multi-hull vessels that is not dependent on complex moving parts, human intervention, an unbroken mast or other factors that limit the current methods. It is particularly relevant to have such a self-righting method for non-sailing and autonomous multi-hull craft.

SUMMARY

One aspect provides a trimaran comprising a main hull with a first end; two amas shorter than the main hull positioned on either side of the main hull near the first end; a self-righting structure extending upwardly from the two amas and comprising two sides, each side curing inward toward the main hull.

The amas and self-righting structure may be positioned near the stern. The amas and self-righting structure may be positioned near the bow.

The amas may be less than half the length of the main hull. The width of the main hull may be less than 50% of the distance between the outside edges of the amas. The main hull may have a rounded topside.

The self-righting structure may comprise a continuous member connected between attachment points on the two amas. The self-righting structure may be U-shaped, horseshoe shaped, may comprise two separate members, and the two sides of the self-righting structure may extend outward beyond the amas before curving inward. The self-righting structure may be constructed of rigid foam, and may be constructed from hollow fiberglass.

The trimaran may comprise a solar array positioned on top of the main hull. The trimaran may be unmanned, may operate autonomously, and may comprise one or more sensors.

In various further aspects, the disclosure provides corresponding systems and devices. In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DRAWINGS

The following figures set forth embodiments in which like reference numerals denote like parts. Embodiments are illustrated by way of example and not by way of limitation in the accompanying figures.

DETAILED DESCRIPTION

Figure 1A:
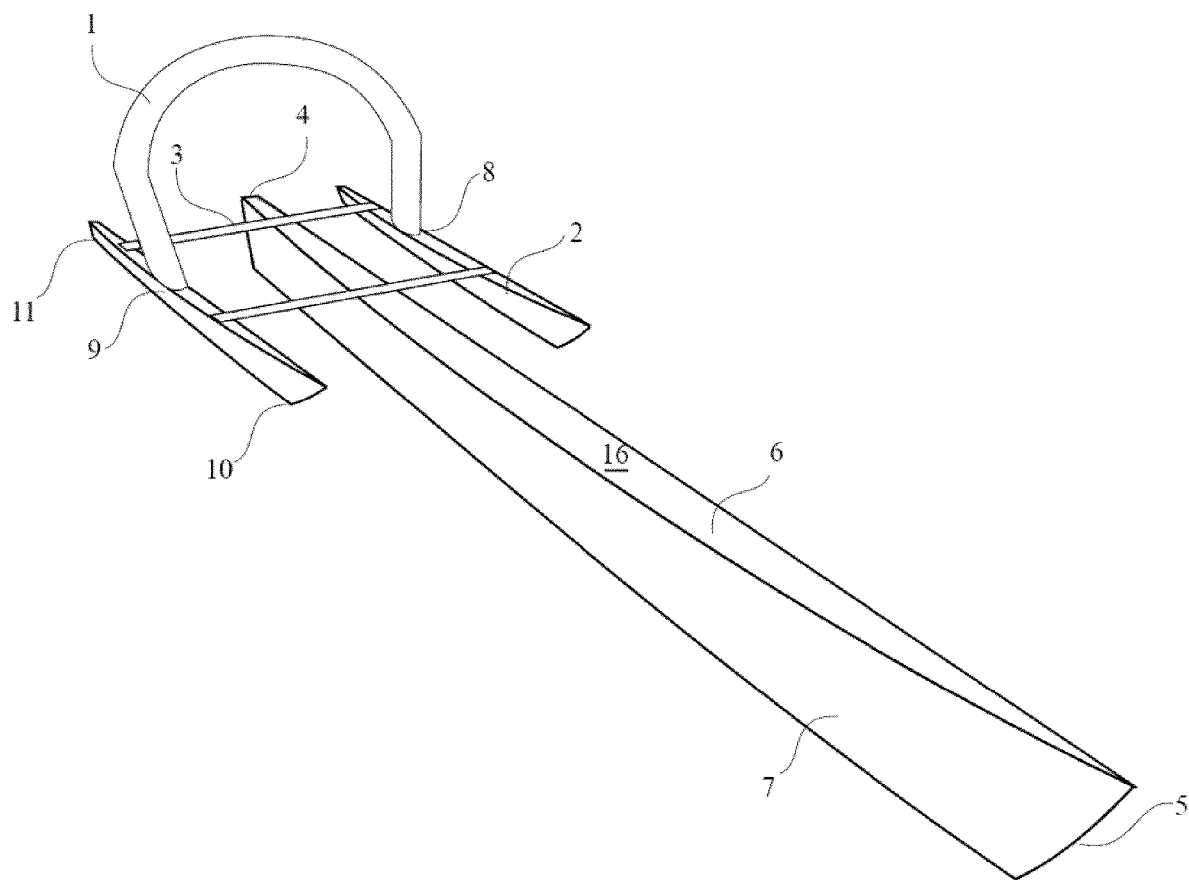
FIG. 1A shows a front perspective of a trimaran with a self-righting structure according to one embodiment.

The following describes a self-righting trimaran.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

FIG. 1A shows a trimaran with a main hull 7 and two peripheral hulls or amas 2 and a self-righting structure 1 according to one embodiment. The amas 2 are positioned closer to the stern 4 of the main hull 7 than the bow 5. The self-righting structure 1 is mounted on the trimaran at mounting points 8 and 9 on the amas 2.

Figure 1B:
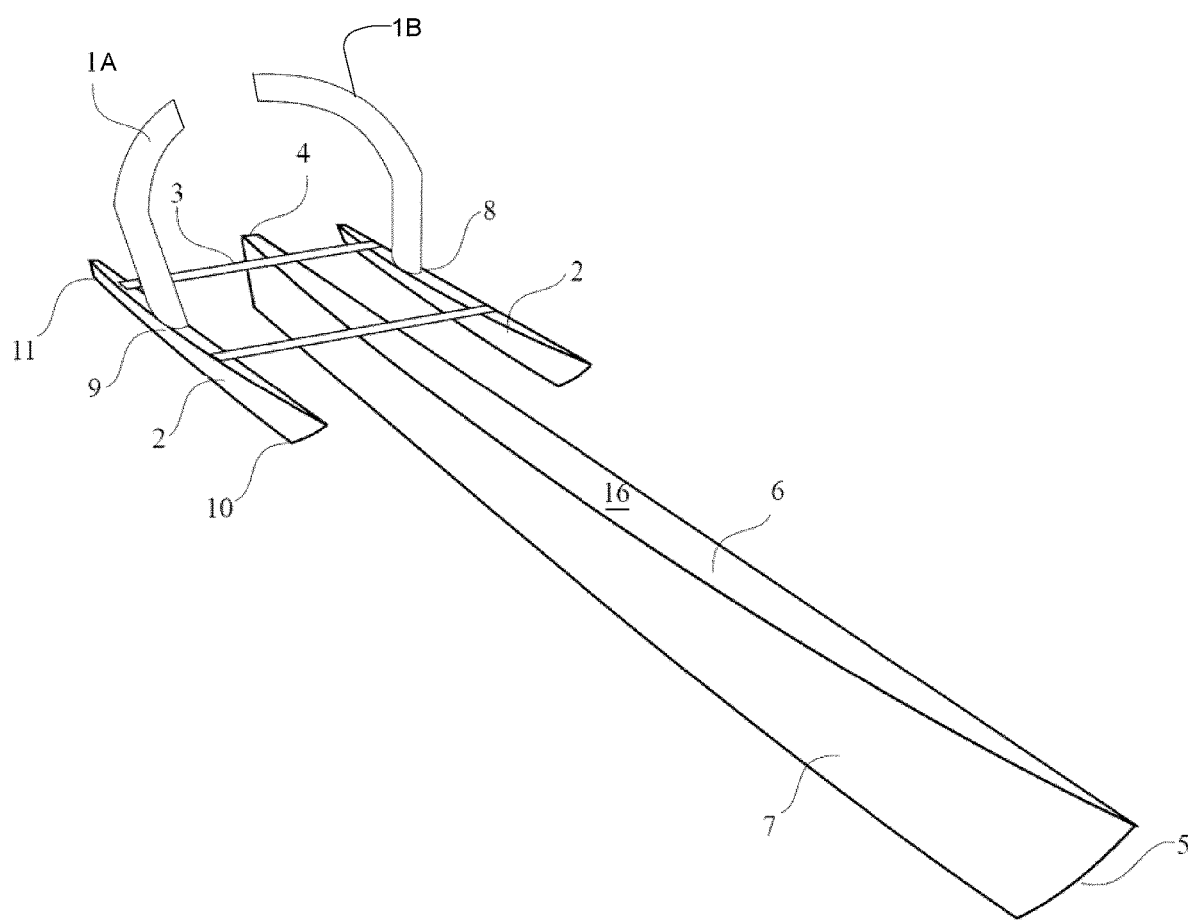
FIG. 1B shows a front perspective of a trimaran with a self-righting structure according to another embodiment.

In the example embodiment shown in FIG. 1A, the self-righting structure 1 is a generally U-shaped structure connected between the amas 2. It is preferably composed of a buoyant material such as foam or hollow fiberglass that is substantially rigid. The self-righting structure can also have alternate configurations and may take other forms in other embodiments. For example, FIG. 1B shows another embodiment wherein the self-righting structure 1 comprises a first portion 1A extending upwardly from the ama 2 and a second portion 1B extending upwardly from the other ama 2, with both portions 1A and 1B curving inwardly. The portions 1A and 1B may be of different lengths, so as to create instability in the inverted position, as described further below. The self-righting structure may also have other shapes as discussed below with respect to FIGS. 3A and 3B. As shown in FIGS., each embodiment of the self-righting structure 1 has a shape that is unchangeable because the self-righting structure 1 does not have hinges or other moving parts that would allow for its shape to change or be changed to a different shape. Accordingly, the self-righting structure 1 can be considered to form a passive self-righting system.

The waterline length of the amas as indicated depicted by the distance from the stern 11 of the ama 2 to the bow 10 of the ama 2 is less than the waterline length of the main hull 7, as defined by the distance from the stern 4 of the main hull 7 to the bow 5 of the main hull. The amas 2 and main hull 7 are connected to each other using a support structure termed an aka 3. In some embodiments, the main hull top surface 6 may be shaped to include a curve that makes it unstable in the inverted position.

Figure 2:
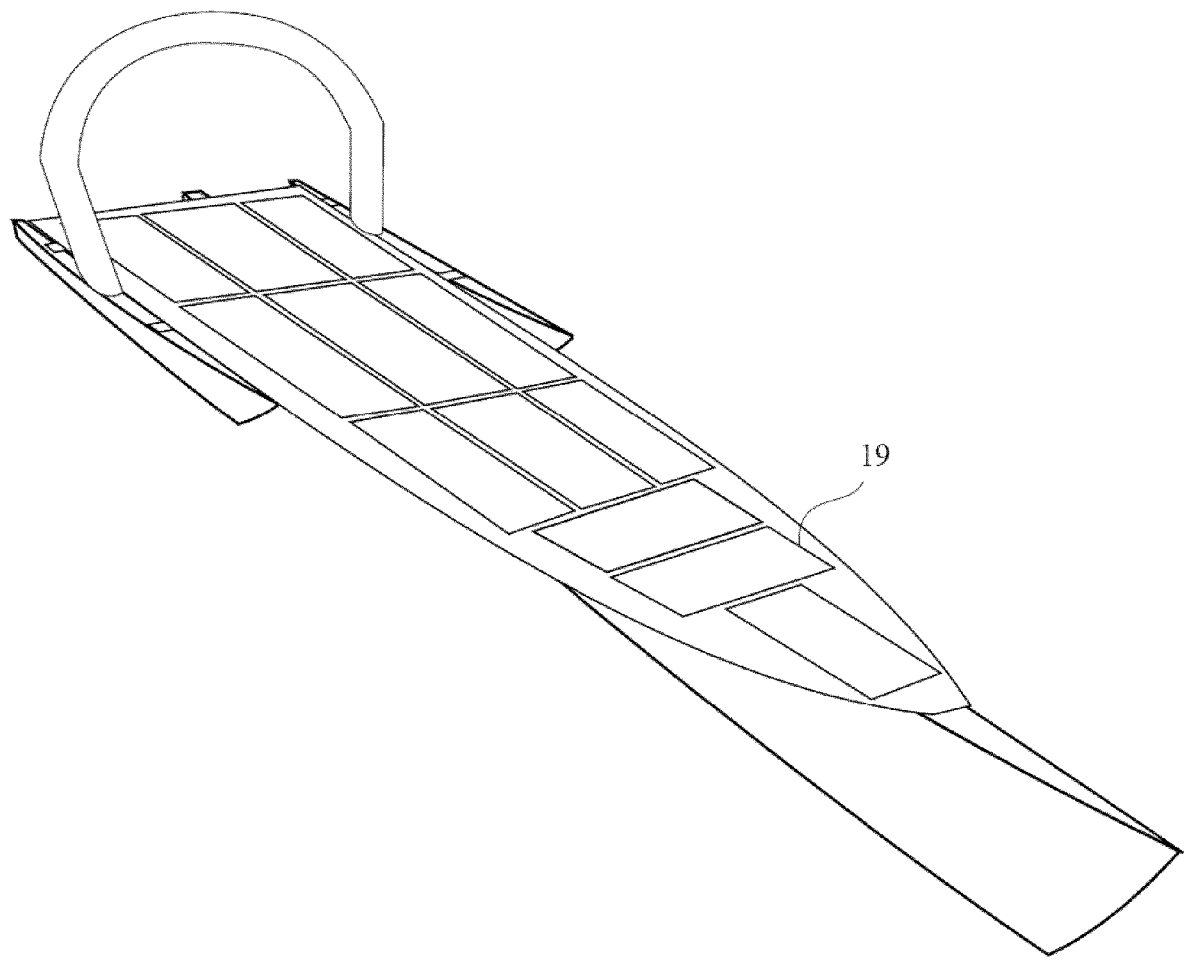
FIG. 2 shows a fore view of a trimaran with a self-righting structure with deck containing solar panels.

As constituted, the trimaran deck structure 16 includes the main hull top surface, ama top surface and the akas 3 that connect the amas 2 to the main hull 7. However, the deck structure could take various other configurations. For example, FIG. 2 shows a trimaran with the self-righting structure and a deck with solar panels 19 supported atop the main hull and amas 2 and akas 3.

Figure 3A:
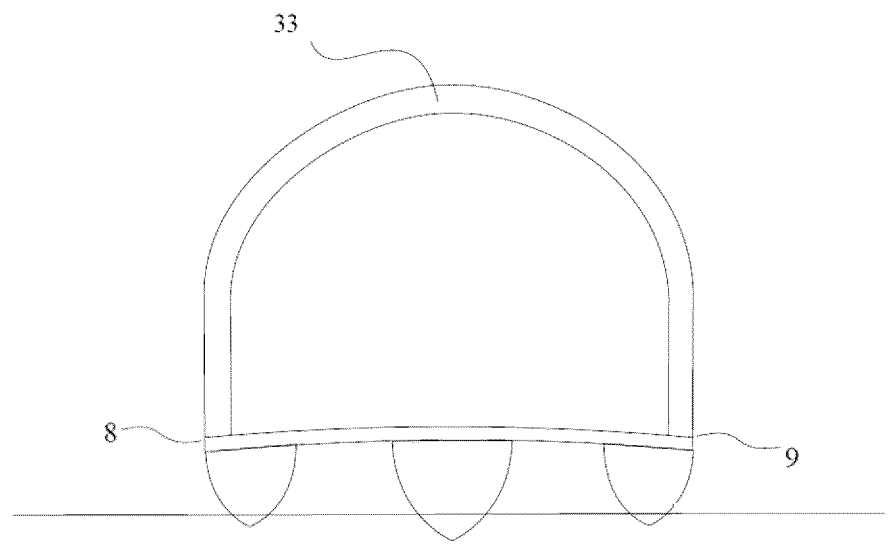
FIG. 3A shows an aft view of the trimaran with a U shaped self-righting structure.
Figure 3B:
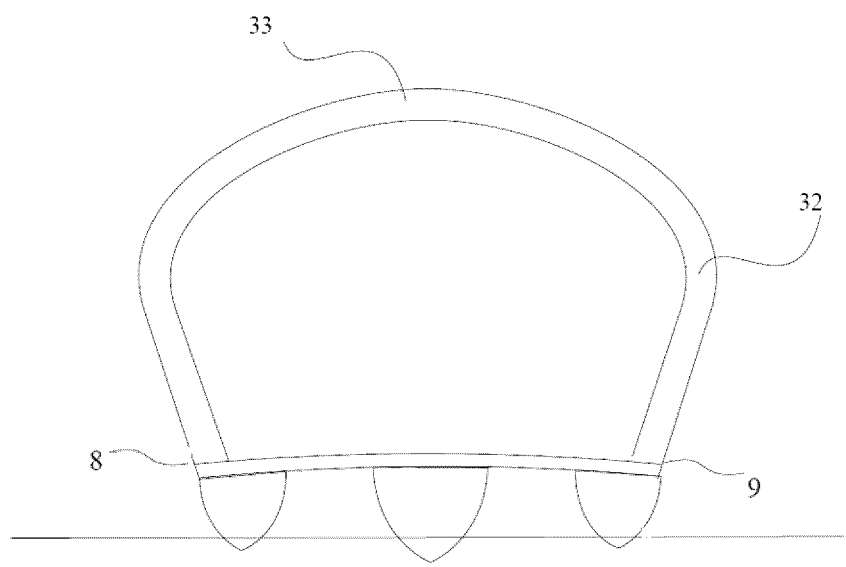
FIG. 3B shows an aft view of the trimaran with a horseshoe shaped self-righting structure.

The self-righting structure is designed so that the boat is unstable in a capsized position. This is achieved by configuring the vessel such that its center of gravity is raised when inverted, and by presenting an inherently unstable shape when inverted. As depicted in FIG. 3A in some embodiments the self-righting structure is U shaped with a curved top 33. In other embodiments, such as for example, shown in FIG. 3B, the self-righting structure can be horseshoe shaped where the sides flare out to further destabilize the craft when it is partially inverted. As depicted in FIG. 3B, above the mounting points 8 and 9, the structure may be angled outwards slightly to create further instability in a non-fully righted position. Where the outwardly angled portion ends the self-righting structure curves back inwards and creates a mid-point curve 32, and a rounded shape to the self-righting structure top 33. The distance between the mid-point curves 32 is greater than the distance between mounting points 8 and 9. This creates further instability as when the craft is in a partially inverted position and resting on the mid-point curve 32 it will be more likely to roll.

Figure 4:
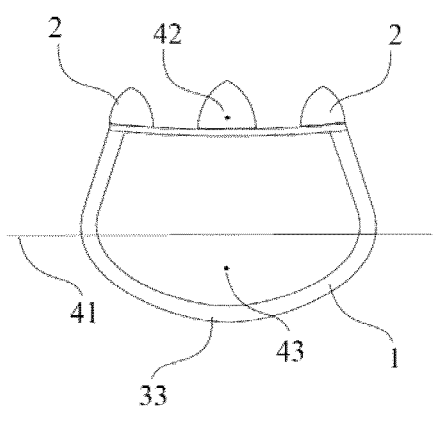
FIGS. 4-9 show aft views of a trimaran with a self-righting structure in a sequence of positions demonstrating its movement from the capsized to upright position.

FIG. 4 to FIG. 9 show an aft view of the trimaran with a self-righting structure in various positions. FIG. 4 shows the trimaran with a self-righting structure in the fully capsized position with a large portion of the self-righting structure under the waterline 41 and the majority of the amas 2 and main hull 7 above the water. The center of gravity 42 is above the center of buoyancy 43 and the vessel is resting in part on the self-righting structure's curved top 33. In this inverted position the craft is in an inherently unstable position because any rolling movement leads to further instability.

Figure 5:
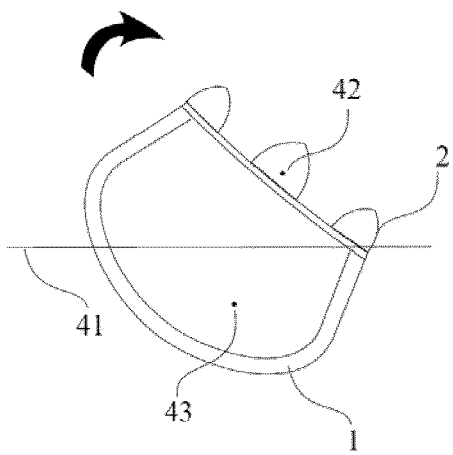
Figure 6:
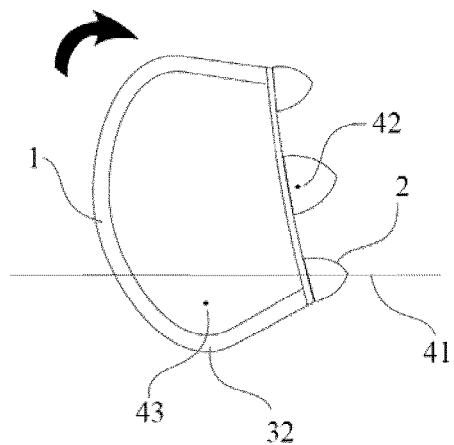

As the trimaran rests in part on the self-righting structure's curved top 33, the vessel rolls as a result of the curvature of the self-righting structure which creates instability and which shifts the center of gravity 42 from being directly over the center of buoyancy 43 into an even less stable position. FIG. 5 shows the trimaran with a self-righting structure 1 moving the vessel towards an upright position with the center of gravity 42 closer to the waterline 41. The center of gravity has shifted and is no longer in line with the center of buoyancy, further decreasing stability, and one of the amas 2 has touched the water. This rolling or pitching along the longitudinal axis, moves the center of buoyancy 43 as the underwater profile of the self-righting structure 1 changes. As depicted in FIG. 6, the trimaran with a self-righting structure has continued its movement and is positioned so that only a small portion of the self-righting of structure 1 is below the waterline 41 and the vessel is resting on the mid-point curve 32 of the self-righting structure 1, which does not provide stability.

Figure 7:
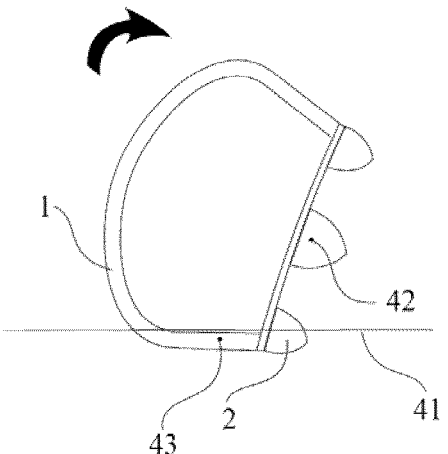
Figure 8:
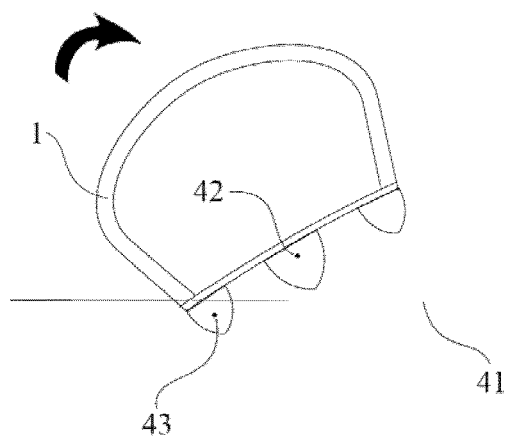
Figure 9:
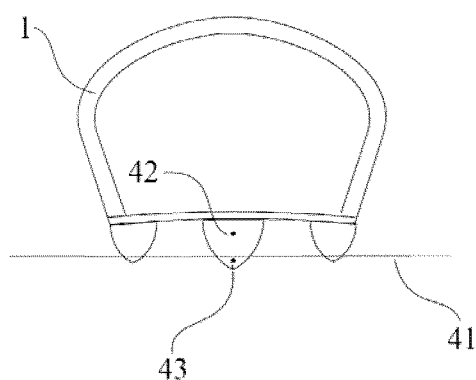

The rotation about the craft's axis will continue from FIG. 6 through FIG. 9 until the center of gravity 42 is once again vertically aligned with the center of buoyancy 43. FIG. 7 shows most of the trimaran with a self-righting structure above the waterline 41. FIG. 8 shows most of the self-righting structure above the waterline 41 and the trimaran sitting primarily on one ama 2. FIG. 9 shows the trimaran in an upright position with the entire self-righting structure 1 above the waterline 41. The craft will once again be stable in the water but in a righted position.

Figure 10:
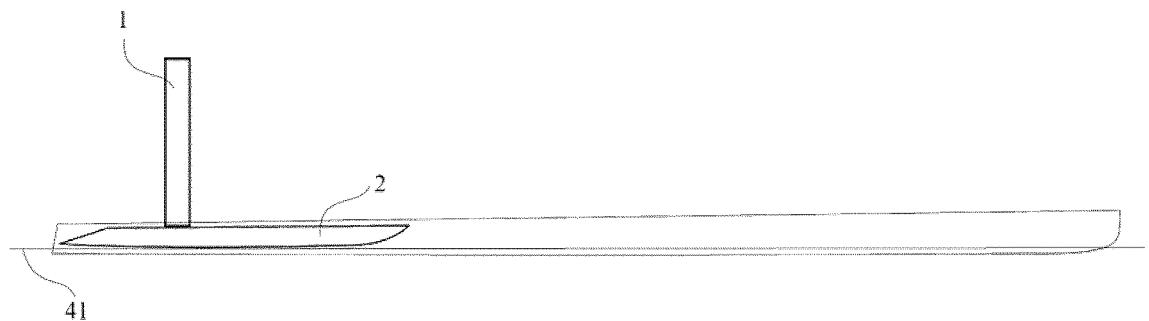
FIG. 10 shows a profile view of a trimaran with a self-righting structure in a fully upright position.
Figure 11:
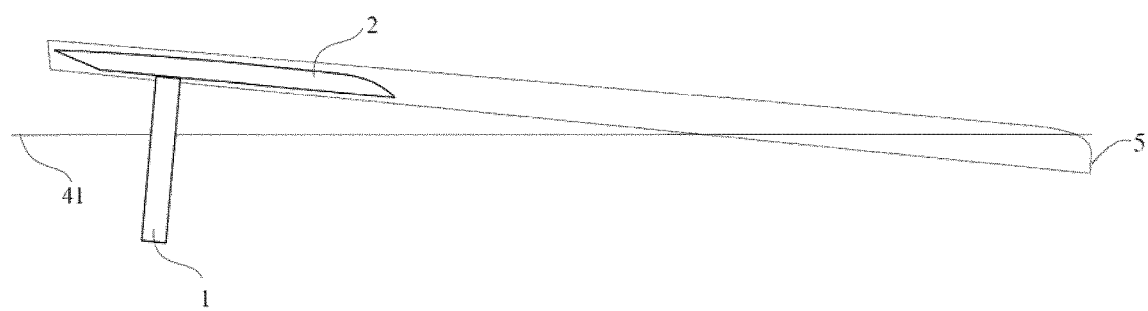
FIG. 11 shows a profile view of a trimaran with a self-righting structure in a fully capsized position.

The instability in the inverted or partially inverted position is also attributed to the positioning of the self-righting structure, size of the amas, location of the amas and shaping of the main hull. As depicted in one embodiment shown in FIG. 10, the self-righting structure 1 may be at the aft end of the vessel. In this embodiment, the amas 2 are also at the aft end of the vessel and are significantly shorter than the main hull 7. As depicted in FIG. 11, in the inverted position the vessel rests on the bow 5 of the main hull 7 and the self-righting structure 1. The amas 2 are either entirely or primarily out of the water. The portion of the deck or main hull 7 that comes in contact with the water may be rounded to further increase the instability. These attributes also allow for instability of the vessel in the partially inverted position as seen in FIG. 12.

Figure 12:
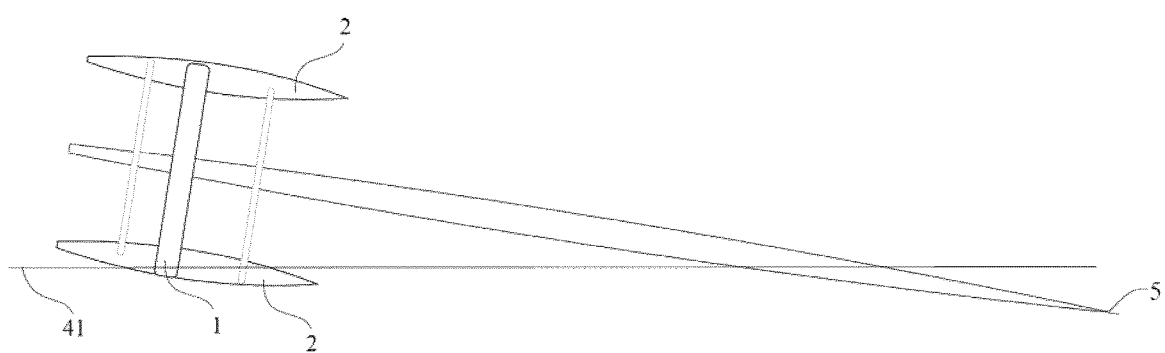
FIG. 12 shows a profile view of a trimaran with a self-righting structure in a partially capsized position.

In the partially righted position depicted in FIG. 12, the vessel rests on the bow 5, as well as an ama 2 and a portion of the self-righting device 1 which provides buoyancy as well as instability to force the boat to continue it self-righting roll.

It is possible to place the self-righting structure at the bow of the boat and amas at an alternate location as well, but amas must both be at or near one end. In the embodiments shown, the amas and self-righting structure are at the stern of the vessel, but in alternative embodiments the amas and self-righting structure could be at the bow. However, other concerns may dictate the position of the amas.

Figure 13:
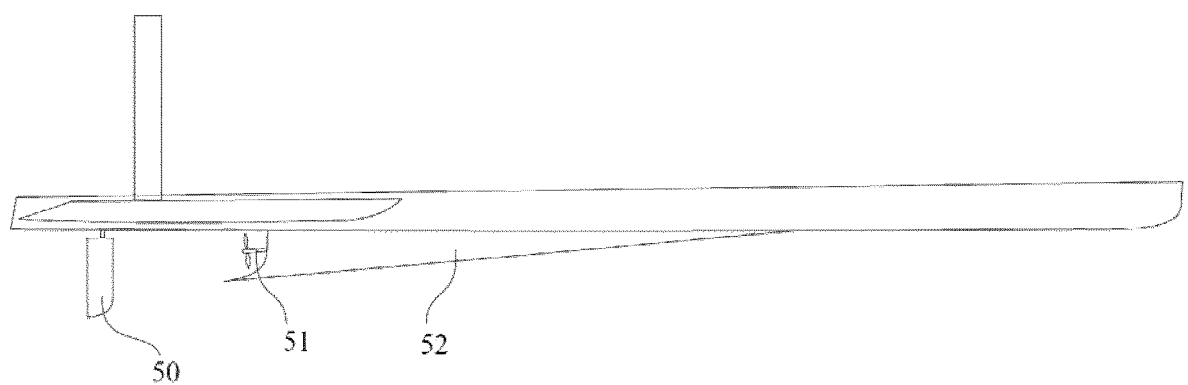
FIG. 13 shows a profile view of a trimaran with a self-righting structure with keel, rudder and propeller.

The trimaran may also have other components such as those depicted in FIG. 13 which includes a keel 52, rudder 50 and propeller 51, as well as other components not depicted that may include sensors for measuring oceanographic and other variables, GPS, computer, and others.

In view of the above discussion, many modifications of the present invention will be obvious to those of ordinary skill in the art. The precise location of the self-righting structure will vary from craft to craft. The length of the amas relative to the main hull will also vary, as will the underwater shaping of these hulls and the curvature of the deck. Many variants for the shaping of the self-righting structure including two sides curving inward, U shaped and horseshoe shaped are detailed here, however other modifications are possible. This invention is applicable to autonomous or unmanned trimarans as human intervention is not required, however it can also be employed with manned craft.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various example embodiments described herein.

The description provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As will be apparent to those skilled in the art in light of the foregoing disclosure, many alterations and modifications are possible to the methods and systems described herein. While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as may reasonably be inferred by one skilled in the art. The scope of the claims should not be limited by the embodiments set forth in the examples, but should be given the broadest interpretation consistent with the foregoing disclosure.

The present disclosure may be embodied in other specific forms without departing from its spirit or essential characteristics. The described embodiments are to be considered in all respects only as illustrative and not restrictive.

The invention claimed is:

1. A watercraft vessel having a first end and a second end opposite the first end, the vessel having opposing lateral sides extending between the first and second ends, the vessel comprising:

a hull; and a structure attached to the vessel and comprising two sides extending upwardly from the opposing lateral sides, extending outwardly beyond the vessel, and thereabove curving inwardly until the two sides are above the vessel nearer to the first end than the second end, such that the structure presents an inherently unstable shape to cause, in conjunction with the hull at the second end, self-righting of the vessel when inverted, the shape being unchangeable.

2. The vessel according to claim 1 wherein the first end is a stern end of the vessel.

3. The vessel according to claim 1, wherein the first end is a bow end of the vessel.

4. The vessel according to claim 1, wherein the hull is a main hull, the vessel is a trimaran comprising two amas that are shorter than the main hull and positioned on either side of the main hull, and wherein the amas are less than half the length of the main hull.

5. The vessel according to claim 1, wherein the hull is a main hull, the vessel is a trimaran comprising two amas that are shorter than the main hull and positioned on either side of the main hull, and wherein a width of the main hull is less than 50% of a distance between outside edges of the amas.

6. The vessel according to claim 1, wherein the hull has a rounded topside.

7. The vessel according to claim 1, wherein the hull is a main hull, the vessel is a trimaran comprising two amas that are shorter than the main hull and positioned on either side of the main hull, and wherein the structure comprises a continuous member connected between attachment points on the two amas.

8. The vessel according to claim 1, wherein the structure is substantially rigid.

9. The vessel according to claim 1, wherein the structure is horseshoe shaped.

10. The vessel according to claim 1, wherein the structure comprises two separate members.

11. The vessel according to claim 8, wherein the structure is constructed from a foam material.

12. The vessel according to claim 8, wherein the structure is constructed from hollow fiberglass.

13. The vessel according to claim 1, wherein the vessel further comprises a solar array positioned on top of the hull.

14. The vessel according to claim 1, wherein the vessel is unmanned.

15. The vessel according to claim 1, wherein the vessel operates autonomously.

16. The vessel according to claim 1, wherein the vessel further comprises one or more sensors.

17. The vessel according to claim 2 wherein the hull is a main hull, the vessel is a trimaran comprising two amas that are shorter than the main hull and positioned on either side of the main hull, and wherein the amas are less than half the length of the main hull.

18. The vessel according to claim 17, wherein a width of the main hull is less than 50% of a distance between outside edges of the amas.

19. The vessel according to claim 18, wherein the main hull has a rounded topside.

20. The vessel according to claim 19, wherein the structure comprises a continuous member connected between attachment points on the two amas.

* * * * *

UNITED STATES PATENT AND TRADEMARK OFFICE
CERTIFICATE OF CORRECTION

| | | |
|---|---|---|
| PATENT NO. | : 11,655,008 B2 | |
| APPLICATION NO. | : 17/048060 | |
| DATED | : May 23, 2023 | |
| INVENTOR(S) | : Colin Sinclair Angus and Julie Rachel Angus | |

It is certified that error appears in the above-identified patent and that said Letters Patent is hereby corrected as shown below:

On the Title Page

Item (54) and in the Specification, Column 1, Line 1 The title should read as follows:
SELF-RIGHTING WATERCRAFT VESSEL Signed and Sealed this
Nineteenth Day of September, 2023

Katherine Kelly Vidal
*Director of the United States Patent and Trademark Office*